GEORGE W. EMERSON'S.
TEMPORARY BINDER.
No. 4,545 Reissued Sep. 12, 1871.
FIG. I.
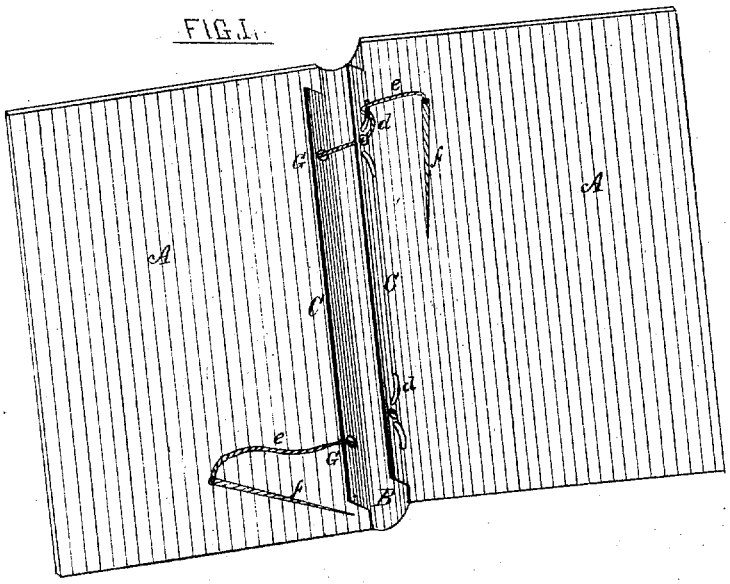
FIG. II.
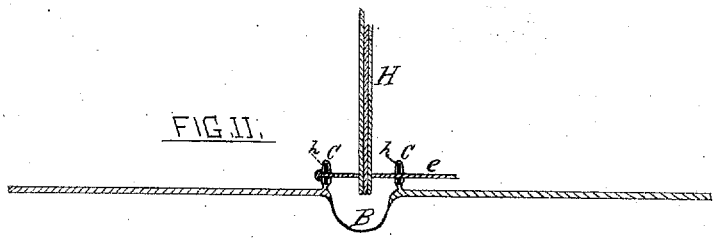
FIG III
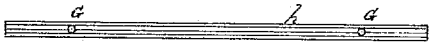
FIG. IV.
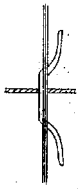
WITNESSES
Arthur H. Chapin
G. L. Chapin
INVENTOR
Geo. W. Emerson

UNITED STATES PATENT OFFICE.

GEORGE W. EMERSON, OF CHICAGO, ILLINOIS, ASSIGNOR TO JOHN R. BARRITT.

IMPROVEMENT IN TEMPORARY BINDERS.

Specification forming part of Letters Patent No. 79,560, dated July 7, 1868; reissue No. 4,545, dated September 12, 1871.

*To all whom it may concern:*

Be it known that I, GEORGE W. EMERSON, of Chicago, in the county of Cook and State of Illinois, have invented a new and useful Improvement in Temporary Binders, of which the following is a specification:

The nature of the present invention consists in providing the flaps of a music-portfolio with suitable metallic stiffening, such as flat hoop-skirt wire. The wires are inserted in the fabric forming the flaps, by means of which the papers or sheets of music bound are held much more firmly in place than when the cord-fastening passes through the fabric of the flap alone, while at the same time the sheets can be bound much more securely, inasmuch as the cords do not cut the paper, be the flaps drawn ever so tightly to the sheets. Again, the wires prevent the sheets from buckling or kinking, for they always present the same holes opposite to each other.

In the drawing, Figure 1 is a perspective representation of a binder or portfolio whose flaps are provided with my improvement; Fig. 2, a transverse section thereof. Fig. 3 shows the hoop-skirt wire or stiffening for the flaps; Fig. 4, a broken-edge view of one of the flaps, showing the cord-fastening.

C C represent the flaps of the portfolio, which are made of fabric or other suitable material, and with openings longitudinally through them to receive hoop-skirt wire *h h*, which has holes punched through it corresponding to the holes in the flaps, so that the cords *e*, put through the holes and the sheets of music, will hold the latter firmly in place.

In the drawing, needles *f f* are represented as used to put the cords *e* through the holes in the flaps and wire; but, as they are a matter of convenience rather than a necessity, they are not claimed. Fastenings *d*, to hold the ends of the cord, are shown; but they are not claimed as a part of the present invention.

Having thus described my invention, what I claim, and desire to secure by Letters Patent, is—

The flaps C C, combined with hoop-skirt wire *h h*, as set forth.

Witnesses: GEORGE W. EMERSON.
G. L. CHAPIN,
A. H. CHAPIN.

(12.)